United States Patent
Brehm et al.

(10) Patent No.: US 12,065,545 B2
(45) Date of Patent: Aug. 20, 2024

(54) EMULSIONS OF AMINOSILOXANES AND SILICATES

(71) Applicant: WACKER CHEMIE AG, Munich (DE)

(72) Inventors: Christof Brehm, Burghausen (DE); Franz Wimmer, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 50 days.

(21) Appl. No.: 17/294,776

(22) PCT Filed: Mar. 5, 2019

(86) PCT No.: PCT/EP2019/055423
§ 371 (c)(1),
(2) Date: May 18, 2021

(87) PCT Pub. No.: WO2020/177859
PCT Pub. Date: Sep. 10, 2020

(65) Prior Publication Data
US 2022/0010074 A1    Jan. 13, 2022

(51) Int. Cl.
| C08L 83/08 | (2006.01) |
| B01F 23/41 | (2022.01) |
| C08G 77/26 | (2006.01) |
| C09D 5/02 | (2006.01) |
| C09D 183/08 | (2006.01) |

(52) U.S. Cl.
CPC .............. *C08G 77/26* (2013.01); *B01F 23/41* (2022.01); *C09D 5/022* (2013.01); *C09D 183/08* (2013.01); *B01F 23/4145* (2022.01)

(58) Field of Classification Search
None
See application file for complete search history.

(56) References Cited

U.S. PATENT DOCUMENTS

| 2006/0041026 A1 | 2/2006 | Mahr et al. |
| 2012/0067766 A1 | 3/2012 | Wang et al. |
| 2013/0165566 A1 | 6/2013 | Merget et al. |
| 2016/0024436 A1* | 1/2016 | Vetter ................. C11D 3/3742 510/528 |

FOREIGN PATENT DOCUMENTS

| DE | 102014216380 A1 | 2/2016 |
| EP | 0068671 A2 | 4/1986 |
| JP | S582349 A | 1/1983 |
| JP | 2004168935 A | 6/2004 |
| JP | 2013537246 A | 9/2013 |
| JP | 2013537253 A | 9/2013 |
| JP | 2013543543 A | 12/2013 |
| WO | 2012038293 A1 | 3/2012 |
| WO | 2012040130 A1 | 3/2012 |
| WO | 2016026737 A1 | 2/2016 |

OTHER PUBLICATIONS

English language translation DE 102014216380, Feb. 2016.*
DE 102014216380, English Abstract & WO 16026737.
G. Engelhardt, H. Jancke, J. Organometal Chem. 28 (1971), English Abstract.
Ullmann's Encyclopedia of Industrial Chemistry, heading "Emulsions", Wiley-VCH Verlag DOI: 10.1002/14356007.a09_297 Article Online Posting Date: Jun. 15, 2000.
G. Engelhardt, H. Jancke: "On the 1H-, 13C- and 29Si-NMR chemical shifts of some linear, branched and cyclic methylsiloxane compounds" in: J. Organometal. Chem. 28 (1971), p. 293-300.
Chapter 8—NMR spectroscopy of organosilicon compounds, Elizabeth A. Williams, The Chemistry of Organic Silicon Compounds, 1989 John Wiley and Sons Ltd., p. 511-533.
JP 2004168935 A, Machine translation.
JPS 582349 A, EP 0068671 A.
JP 2013543543 A, WO 2012040130 A.
JP 2013537246 A, WO 2012038293 A.
JP 2013537253 A, US 2013165566 A.

* cited by examiner

*Primary Examiner* — Margaret G Moore
(74) *Attorney, Agent, or Firm* — BROOKS KUSHMAN P.C.

(57) ABSTRACT

Oil-in-water emulsions containing
(i) 100 parts by weight of polyorganosiloxanes bearing aminoalkyl groups, liquid at 20° C.,
(ii) protonating agent,
(iii) 1 to 80 parts by weight of silicate compound,
(iv) water,
(v) at most 5 parts by weight emulsifier and
(vi) at least 5 parts by weight of an organic solvent selected from monoalcohols of the formula IX $$R^{11}\text{—OH} \qquad (IX),$$

and dialcohol monoethers of the formula X $$R^{12}O\text{—}R^{13}\text{—}OR^{14} \qquad (X),$$

with the proviso that the emulsion comprises at most 10 parts by weight of a di-, tri- or oligoglycol ether, are useful for treating substrates.

14 Claims, No Drawings

EMULSIONS OF AMINOSILOXANES AND SILICATES

CROSS REFERENCE TO RELATED APPLICATIONS

This application is the U.S. National Phase of PCT Appln. No. PCT/EP2019/055423 filed Mar. 5, 2019, the disclosure of which is incorporated in its entirety by reference herein.

BACKGROUND OF THE INVENTION

1. Field of the Invention

The invention relates to oil-in-water emulsions of polydimethylsiloxane comprising aminoalkyl groups, and silicates, and a process for treating substrates therewith.

2. Description of the Related Art

Emulsions based on aminosiloxanes and silicates are used for repelling aqueous soiling of porous or non-porous, absorbent or non-absorbent substrates.

DE 10 2014 216 380 describes oil-in-water emulsions of aminosiloxanes in combination with silicates which can be used for hydrophobizing treatment of porous or non-porous, absorbent or non-absorbent substrates.

The formulations described in DE 10 2014 216 380 use oligoglycol ethers, for example diethylene glycol butyl ether, as auxiliaries for increasing the storage stability. A disadvantage of these auxiliaries is that, due to the rather high hydrophilicity caused by two or more glycol groups, the water repellency, as well as that of water-alcohol mixtures, is still not sufficiently good.

SUMMARY OF THE INVENTION

The invention relates to oil-in-water emulsions containing specific polyorganosiloxanes bearing aminoalkyl groups, a protonating agent, a silicate compound, at most 5 wt. % emulsifier and a monoalcohol or dialcohol monoether.

DETAILED DESCRIPTION OF THE PREFERRED EMBODIMENTS

The invention thus relates to oil-in-water emulsions comprising (i) 100 parts by weight of polyorganosiloxane(s) (P) bearing aminoalkyl groups and liquid at 20° C., comprising at least 80 mol % of units selected from units of the general formulae Ia, Ib, IIa and IIb $$R^1{}_2SiO_{(2/2)} \qquad (Ia),$$

$$R^1{}_aR^2SiO_{(3-a)/2} \qquad (Ib),$$

$$R^3{}_3SiO_{(1/2)} \qquad (IIa),$$

$$R^3{}_2R^4SiO_{(1/2)} \qquad (IIb),$$

in which
a has the value 0 or 1,
$R^1$ are alkyl radicals having 1-40 carbon atoms that are unsubstituted or substituted by halogens,
$R^2$ is an aminoalkyl radical of the general formula III $$-R^5-NR^6R^7 \qquad (III),$$

where
$R^5$ is a divalent hydrocarbon radical having 1-40 carbon atoms,
$R^6$ is a monovalent hydrocarbon radical having 1-40 carbon atoms, hydrogen, or an alkanoyl radical and
$R^7$ is a radical of the general formula IV $$-(R^8-NR^6)_xR^6 \qquad (IV),$$

where
x has the value 0 or an integer value of 1 to 40 and
$R^8$ is a divalent radical of the general formula V $$-(CR^9R^9-)_y \qquad (V),$$

where
y has an integer value of 1 to 6,
$R^9$ is hydrogen or a hydrocarbon radical having 1-40 carbon atoms,
$R^3$ are alkyl radicals having 1-40 carbon atoms that are unsubstituted or substituted by halogens,
$R^4$ are —OR or —OH radicals and,
R are alkyl radicals having 1-40 carbon atoms that are unsubstituted or substituted by halogens,
  wherein the average ratio of the units of the general formulae Ia and Ib to the sum total of units of the general formulae IIa and IIb in the polyorganosiloxane (P) is 0.5 to 500 and polyorganosiloxane (P) has an average amine number of at least 0.1 mequiv/g,
(ii) a protonating agent,
(iii) 1 to 80 parts by weight of a silicate compound selected from the tetraalkoxysilicate of the general formula VI $$R^{10}O_4Si \qquad (VI),$$

and polysilicate compounds comprising at least 80 mol % units of the general formulae VII and VIII and at least 2 units of the general formula VII $$R^{10}O_3SiO_{1/2} \qquad (VII),$$

$$R^{10}O_2SiO_{2/2} \qquad (VIII),$$

and mixtures thereof, where
$R^{10}$ are hydrocarbon radicals having 1-18 carbon atoms that are unsubstituted or substituted by halogens,
(iv) water,
(v) at most 5 parts by weight emulsifier and
(vi) at least 5 parts by weight of an organic solvent selected from monoalcohols of the general formula IX $$R^{11}-OH \qquad (IX),$$

and dialcohol monoethers of the general formula X $$R^{12}O-R^{13}-OR^{14} \qquad (X),$$

and mixtures thereof, where
$R^{11}$ are monovalent hydrocarbon radicals having 2-18 carbon atoms,
$R^{12}$ are monovalent hydrocarbon radicals having 1-18 carbon atoms,
$R^{13}$ are divalent hydrocarbon radicals having 2-12 carbon atoms,
$R^{14}$ is hydrogen, monovalent hydrocarbon radicals having 1-6 carbon atoms or the acetyl group, with the proviso that the emulsion comprises at most 10 parts by weight of a di-, tri- or oligoglycol ether of the general formula XI where $R^{15}$ has the definition of $R^{12}$ and m is an integer and is 2 or greater than 2.

The emulsions, despite the low amount or absence of the di-, tri- or oligoglycol ether of the general formula XI and without further addition of other stabilizing ingredients such as emulsifiers or silicon-polyether copolymer emulsifiers, are homogeneous, stable, and stable to dilution.

The emulsions exhibit excellent water-repellency on many porous or non-porous, absorbent or non-absorbent substrates, particularly on fibres and textiles. The test in accordance with DIN EN 24920 is very good on textiles treated with the emulsions.

The substrates treated with the emulsions also exhibit improved soil repellency.

The emulsions further exhibit significant gloss enhancement on many porous or non-porous, absorbent or non-absorbent substrates.

The alkyl radicals $R^1$, $R^3$ and R may be linear, cyclic, branched, saturated or unsaturated. The alkyl radicals $R^1$, $R^3$ and R preferably have 1-18 carbon atoms, particularly 1 to 6 carbon atoms, particular preference being given to the methyl radical or ethyl radical. Preferred halogen substituents are fluorine and chlorine. A particularly preferred $R^1$, $R^3$ and R radical is the methyl radical.

The divalent hydrocarbon radicals $R^5$ may be halogen-substituted, linear, cyclic, branched, aromatic, saturated or unsaturated. The radicals $R^5$ preferably have 1 to 6 carbon atoms, particular preference being given to alkylene radicals, especially propylene. Preferred halogen substituents are fluorine and chlorine.

The monovalent hydrocarbon radicals $R^6$ may be halogen-substituted, linear, cyclic, branched, aromatic, saturated or unsaturated. The radicals $R^6$ preferably have 1 to 6 carbon atoms, particular preference being given to alkyl radicals or alkanoyl radicals having 1 to 6 carbon atoms. Preferred halogen substituents are fluorine and chlorine. Particularly preferred substituents $R^6$ are hydrogen, the methyl, the ethyl, the cyclohexyl radical and the acetyl radical.

The monovalent hydrocarbon radicals $R^9$ may be halogen-substituted, linear, cyclic, branched, aromatic, saturated or unsaturated. The radicals $R^9$ preferably have 1 to 6 carbon atoms, particular preference being given to alkyl radicals having 1 to 6 carbon atoms. Preferred halogen substituents are fluorine and chlorine. Particularly preferred substituents $R^9$ are hydrogen, the methyl, the ethyl and the cyclohexyl radical.

Preferably, x has the value 0 or a value of 1 to 18, more preferably 1 to 6.

Particularly preferred radicals $R^2$ are $-CH_2N(R^6)_2$, $-(CH_2)_3N(R^6)_2$, $-(CH_2)_3N(R^6)(CH_2)_2N(R^6)_2$, especially the aminopropyl radical, aminoethylaminopropyl radical and cyclohexylaminopropyl radical.

The polydimethylsiloxane (P) is preferably composed of at least 3, particularly at least 10 units and preferably at most 500 units, particularly at most 200 units of the formula Ia, Ib, IIa and IIb.

The polydimethylsiloxane (P) preferably has a chain length of 3 to 1000 repeating units, especially 10 to 500 repeating units.

The viscosity of the polydimethylsiloxane (P) is preferably 1 to 100,000 mPa·s, especially 10 to 10,000 mPa·s at 20° C.

The ratio of the number of units Ia to the number of units Ib is selected such that the polydimethylsiloxane (P) has an amine number of at least 0.1 mequiv/g polydimethylsiloxane (P), preferably at least 0.15 mequiv/g polydimethylsiloxane (P). The amine number of the polydimethylsiloxane (P) is at most 7 mequiv/g, preferably at most 2 mequiv/g, especially at most 0.6 mequiv/g.

The polydimethylsiloxane (P) preferably has either exclusively units of the formula IIa, exclusively units of the formula IIb or a combination of units of the formula IIa and IIb.

The polydimethylsiloxane (P) is produced by known chemical methods such as hydrolysis or equilibration for example.

The protonating agent is preferably a monoprotic or multiprotic, water-soluble or water-insoluble, organic or inorganic acid.

Suitable protonating agents are, for example, formic acid, acetic acid, propionic acid, malonic acid, citric acid, hydrochloric acid, sulfuric acid, phosphoric acid or mixtures thereof. Preferred protonating agents are formic acid, acetic acid, sulfuric acid or hydrochloric acid. Particular preference is given to acetic acid.

The protonating agent is generally added undiluted or in the form of an aqueous solution.

The protonating agent is preferably added in an amount of 0.05 to 2 mol of protons per mole of basic nitrogen atoms of the radicals $R^2$.

The protonating agent is preferably added in an amount such that the oil-in-water emulsions reach a pH in a range from 3.5 to 7.0, preferably a pH between 3.5 and 6.0 and more preferably a pH between 3.5 and 5.0.

In the context of the present invention, the pH is measured with an electrode in accordance with US Pharmacopeia USP 33 at 20° C.

The monovalent hydrocarbon radicals $R^{10}$ of the silicate compound may be halogen-substituted, linear, cyclic, branched, aromatic, saturated or unsaturated. The radicals $R^{10}$ preferably have 1 to 6 carbon atoms, particular preference being given to alkyl radicals and phenyl radicals. Preferred halogen substituents are fluorine and chlorine. Particularly preferred radicals $R^{10}$ are methyl, ethyl and propyl.

The emulsions preferably comprise 5 to 50 parts by weight, particularly preferably 10 to 30 parts by weight of the silicate compound, based on 100 parts by weight polydimethylsiloxane (P).

The polysilicate compound preferably comprises at least 90, especially at least 95 mol % units of the general formulae VII and VIII.

The remaining units of the polysilicate compound may be, for example, units of the general formulae XII and XIII

$$R^{10}OSiO_{3/2} \quad (XII),$$

$$SiO_{4/2} \quad (XIII),$$

where $R^{10}$ is as defined above.

The oil-in-water emulsions may also additionally comprise silicone oils, silicone waxes and silicone resins, preferably in amounts of at most 5 parts by weight, particularly at most 2 parts by weight.

The water is demineralized or salt-containing water, preferably demineralized water.

The oil-in-water emulsions according to the invention preferably comprise at most 3, more preferably at most 1, especially at most 0.1 parts by weight emulsifier.

As emulsifiers, it is possible to use all ionic and non-ionic emulsifiers known to date, either individually or as mixtures of different emulsifiers, with which aqueous dispersions, particularly aqueous emulsions of organopolysiloxanes, could also be currently produced.

Examples of anionic emulsifiers are:

1. Alkyl sulfates, particularly those having a chain length of 8 to 18 carbon atoms, alkyl- and alkaryl ether sulfates having 8 to 18 carbon atoms in the hydrophobic radical and 1 to 40 ethylene oxide (EO) or propylene oxide (PO) units.

2. Sulfonates, particularly alkyl sulfonates having 8 to 18 carbon atoms, alkylaryl sulfonates having 8 to 18 carbon atoms, taurides, esters and semi-esters of sulfosuccinic acid with monohydric alcohols or alkylphenols having 4 to 15 carbon atoms; these alcohols or alkylphenols can optionally also be ethoxylated with 1 to 40 EO units.

3. Alkali metal salts and ammonium salts of carboxylic acids having 8 to 20 carbon atoms in the alkyl, aryl, alkaryl or aralkyl radicals.

4. Partial esters of phosphoric acid and alkali metal and ammonium salts thereof, particularly alkyl and alkaryl phosphates having 8 to 20 carbon atoms in the organic radical, alkyl ether phosphates or alkaryl ether phosphates having 8 to 20 carbon atoms in the alkyl or alkaryl radical and 1 to 40 EO units.

Examples of non-ionic emulsifiers are:

5. Polyvinyl alcohol comprising 5 to 50%, preferably 8 to 20 vinyl acetate units, having a degree of polymerization of 500 to 3000.

6. Alkyl polyglycol ethers, preferably those having 3 to 40 EO units and alkyl radicals of 8 to 20 carbon atoms.

7. Alkylaryl polyglycol ethers, preferably those having 5 to 40 EO units and 8 to 20 carbon atoms in the alkyl and aryl radicals.

8. Ethylene oxide/propylene oxide(EO/PO) block copolymers, preferably those having 8 to 40 EO or PO units.

9. Addition products of alkylamines, having alkyl radicals of 8 to 22 carbon atoms, with ethylene oxide or propylene oxide.

10. Fatty acids having 6 to 24 carbon atoms.

11. Alkyl polyglycosides of the general formula R*—O—ZO, in which R* is a linear or branched, saturated or unsaturated alkyl radical having on average 8-24 carbon atoms and ZO is an oligoglycoside radical having on average o=1-10 hexose or pentose units or mixtures thereof. 12. Natural substances and derivatives thereof such as lecithin, lanolin, saponins, cellulose; cellulose alkyl ethers and carboxyalkyl celluloses, the alkyl groups of which each have up to 4 carbon atoms.

13. Polar groups, particularly comprising the elements O, N, C, S, P, Si, comprising linear organo(poly)siloxanes, particularly those with alkoxy groups having up to 24 carbon atoms and/or up to 40 EO and/or PO groups.

Examples of cationic emulsifiers are:

14. Salts of primary, secondary and tertiary fatty amines having 8 to 24 carbon atoms with acetic acid, sulfuric acid, hydrochloric acid and phosphoric acids.

15. Quaternary alkyl- and alkylbenzeneammonium salts, particularly those of which the alkyl groups have 6 to 24 carbon atoms, especially the halides, sulfates, phosphates and acetates.

16. Alkylpyridinium, alkylimidazolinium and alkyloxazolinium salts, particularly those of which the alkyl chain has up to 18 carbon atoms, especially the halides, sulfates, phosphates and acetates.

Suitable as ampholytic emulsifiers are in particular:

17. Long-chain substituted amino acids such as N-alkyldi (aminoethyl)glycine or N-alkyl-2-aminopropionic acid salts.

18. Betaines such as N-(3-acylamidopropyl)-N,N-dimethylammonium salts having a C8-C18-acyl radical and alkylimidazolium betaines.

As emulsifiers, preference is given to non-ionic emulsifiers, particularly the alkyl polyglycol ethers listed above under 6. and cationic emulsifiers, particularly the quaternary alkyl- and alkylbenzeneammonium salts listed above under 15. The emulsifier may consist of one of the aforementioned emulsifiers or a mixture of two or more aforementioned emulsifiers which may be used in pure form or as solutions of one or more emulsifiers in water or organic solvents.

The oil-in-water emulsions preferably comprise organic solvents selected from the group of monoalcohols of the general formula IX or dialcohol monoethers of the general formula X, which have a boiling point or boiling range of at most 260° C. at 0.10 MPa.

The monovalent hydrocarbon radicals $R^{11}$ may be linear, cyclic, branched, aromatic, saturated or unsaturated. The radicals $R^{11}$ preferably have 2 to 12 carbon atoms, particular preference being given to alkyl radicals and phenyl radicals. Examples of monovalent hydrocarbon radicals $R^{11}$ are alkyl groups such as the ethyl, n-propyl, isopropyl, n-butyl, isobutyl, n-hexyl, n-heptyl, n-octyl, isooctyl, 2-ethylhexyl, n-nonyl, n-decyl, n-undecyl, phenyl, 2-butyloctyl and the n-dodecyl group.

The monovalent hydrocarbon radicals $R^{12}$ may be linear, cyclic, branched, aromatic, saturated or unsaturated. The radicals $R^{12}$ preferably have 1 to 12 carbon atoms, particular preference being given to alkyl radicals and phenyl radicals. Examples of monovalent hydrocarbon radicals $R^{12}$ are alkyl groups such as the methyl, ethyl, n-propyl, isopropyl, n-butyl, isobutyl, n-hexyl, n-heptyl, n-octyl, 2-ethylhexyl, n-nonyl, n-decyl, n-undecyl, phenyl, 2-butyloctyl and the n-dodecyl group.

The divalent hydrocarbon radicals $R^{13}$ may be linear, cyclic, branched, saturated or unsaturated. The radicals $R^{13}$ preferably have 2 to 6 carbon atoms, particular preference being given to alkylene radicals, particularly the 1,2-ethylene radical, the 1,3-propylene radical, the 1,2-propylene radical, the 1,2-butylene radical, the 1,3-butylene radical and the 1,4-butylene radical.

In the case that $R^{14}$ is a monovalent hydrocarbon radical, this may be linear, cyclic, branched, aromatic, saturated or unsaturated. $R^{14}$ is preferably hydrogen, an alkyl radical, especially the methyl or the ethyl radical, a phenyl radical or an acetyl group. $R^{14}$ is most preferably hydrogen.

Examples of monoalcohols of the general formula IX are ethanol, n-propanol, isopropanol, butanol, pentanol, hexanol, heptanol or n-octanol or Guerbet alcohols such as 2-ethylhexanol, 2-butyloctanol or 2-hexyldecanol.

Preferred examples of monoalcohols of the general formula IX are n-hexanol, n-heptanol, n-octanol and 2-ethylhexanol.

Examples of dialcohol monoethers and derivatives thereof of the general formula X are monoethylene glycol monoalkyl ethers, for example ethylene glycol monomethyl ether, ethylene glycol monoethyl ether, ethylene glycol monopropyl ether, ethylene glycol mono-n-butyl ether, ethylene glycol monobutyl ether acetate, ethylene glycol monophenyl ether, ethylene glycol monohexyl ether.

Example of dialcohol monoethers and derivatives thereof of the general formula X are monopropylene glycol monoalkyl ethers, for example propylene glycol monomethyl ether, propylene glycol monomethyl ether acetate, propylene glycol monopropyl ether, propylene glycol monobutyl ether or propylene glycol monophenyl ether.

The oil-in-water emulsions preferably comprise at least 10 parts by weight, more preferably at least 20 parts by weight, and especially at least 30 parts by weight and at most 150 parts by weight, preferably at most 100 parts by weight organic solvent selected from the group of monoalcohols of the general formula IX or dialcohol monoethers of the general formula X.

The oil-in-water emulsions may comprise an organic solvent or a combination of two or more organic solvents. In particular, the oil-in-water emulsions comprise a single organic solvent.

The oil-in-water emulsions may comprise further substances such as preservatives, fragrances, rust inhibitors and dyes.

The oil-in-water emulsions preferably comprise at most 8 parts by weight, more preferably at most 5 parts by weight, and more preferably at most 2 parts by weight, and most preferably at most 1 part by weight of a di-, tri- or oligo-glycol ether of the general formula XI.

Examples of preservatives are alcohols, phenoxyethanol, quaternary ammonium compounds, for example N-alkyl (C12-18)-N,N -dimethyl-N-benzylammonium chloride, formaldehyde, parabens, benzyl alcohol, propionic acid and salts thereof and also isothiazolinones.

The oil-in-water emulsions may in addition also comprise other additives such as non-silicon-containing oils, resins and waxes. Examples of these are rapeseed oil, olive oil, mineral oil, paraffin oil or non-silicon-containing waxes such as carnauba wax and candelilla wax or montanic acid and montanic ester waxes, anoxidized synthetic paraffins, polyethylene waxes, polyvinyl ether waxes and waxes containing metal soaps, wherein preference is given to carnauba wax, paraffin waxes and polyethylene waxes and particular preference is given to paraffin waxes.

The oil-in-water emulsions preferably comprise at most 30.0 parts by weight, more preferably at most 10 parts by weight, and most preferably at most 0.1 parts by weight of such additives, based in each case on 100 parts by weight polyorganosiloxane (P).

The oil-in-water emulsions are produced by mixing the combination of polyorganosiloxane (P), protonating agent, silicate compound, water and organic solvent and optionally with further components. The mixing is preferably carried out at a temperature of preferably 10-80° C., more 15-40° C., and preferably at a pressure of 900 to 1100 hPa. However, the mixing can also be carried out at higher or lower pressures.

In a favoured procedure, the polyorganosiloxane (P) and the silicate compound are pre-mixed. This pre-mix is then incorporated in a mixture of water, protonating agent, organic solvent and optionally further components and then diluted with further water to give the oil-in-water emulsion.

The production can be conducted discontinuously or continuously.

Technologies for producing emulsions of organopolysiloxanes are known. For instance, intensive mixing and dispersing can be effected in rotor-stator stirring devices, colloid mills, high pressure homogenizers, microchannels, membranes, jet nozzles and similar, or by means of ultrasound. Homogenizing devices and methods are described, for example, in Ullmann's Encyclopedia of Industrial Chemistry, CD-ROM edition 2003, Wiley-VCH Verlag, under the heading "Emulsions".

The oil-in-water emulsions can be diluted with water in any ratios. The emulsions may comprise water preferably in amounts of preferably at least 10.0 parts by weight, particularly at least 100.0 parts by weight, preferably at most 5000 parts by weight, especially at most 1000 parts by weight.

The oil-in-water emulsions, independent of the water fraction, are clear to opaque liquids preferably having a viscosity at 25° C. of 5 to 10,000 $mm^2/s$, more preferably 5 to 1000 $mm^2/s$, and especially 10 to 500 $mm^2/s$.

The invention further relates to a process for treating substrates with the oil-in-water emulsions. The treatment is preferably and especially water- and soil-repellent impregnation as well as gloss enhancement of porous or non-porous, absorbent or non-absorbent substrates, preferably of celluloses, paper, natural and/or synthetic textile fibres, mineral building materials, stone, tiles, marble, metals, painted metals, glass, ceramics, glass ceramic, plastics, coated plastics, wood, laminate, cork, rubber, imitation leather, leather and cosmetic applications such as skin and hair.

Particularly preferred is the treatment and impregnation of any fibres, especially natural and synthetic textiles and functional materials.

The oil-in-water emulsions are outstandingly suitable for impregnating fibres in a commercial washing machine by addition to the fabric softener chamber. In this case, the laundry is cleaned in a wash cycle and brought into contact with the oil-in-water emulsion in the fabric softening cycle. A time-consuming second treatment step in the washing machine or a subsequent treatment of the textiles by spraying for the impregnation is no longer necessary.

Furthermore, the oil-in-water emulsions can not only be used to make textiles and general porous or non-porous, absorbent or non-absorbent substrates waterproof and to enhance the gloss thereof. Rather the oil-in-water emulsions (partly in combination with other additives) can achieve still other effects such as resistance to environmental influences such as heat, sunlight, particularly UV radiation, oxidizing agents, acidic environments, or particularly finishing effects in textiles such as colour protection, fibre resistance, crease-free, soil repellence, shrink protection, flame retardance, moth protection, anti-felt finish or antimicrobial finish.

All symbols above of the aforementioned formulae are each defined independently of one other. The silicon atom is tetravalent in all formulae. The amounts in parts by weight refer to 100 parts by weight polydimethylsiloxane (P).

In the following example, unless stated otherwise in each case, all amounts and percentages are based on weight, all pressures are 0.10 MPa (abs.) and all temperatures 20° C. The sum total of all constituents of the silicone mixture add up to 100% by weight.

Unless stated otherwise, the following examples are carried out at the pressure of the ambient atmosphere, i.e. at about 1000 hPa, and at room temperature, i.e. about 20° C. or at a temperature set when combining the reactants at room temperature without additional heating or cooling.

Dynamic viscosities are measured on a "MCR 302" rheometer from Anton Paar in accordance with DIN EN ISO 3219: 1994 and DIN 53019, in which a cone-plate system (cone CP50-2) with an opening angle of 2° is used. The instrument is calibrated with 10000 standard oil from the National Metrology Institute of Germany. The measuring temperature is 25.00° C. +/−0.05° C., the measurement time 3 min. The viscosity figure (stated in mPas) is the arithmetic mean of three independently conducted individual measurements. The measurement uncertainty in the dynamic viscosity is 1.5%. The shear rate gradient is selected depending on the viscosity and is separately identified for each viscosity figure.

Kinematic viscosities are determined by means of a ViscoSystem® AVS 350 viscosity measuring system from Schott using Ubbelohde viscometer tubes having a constant (e.g. from Windaus or VWR) in accordance with DIN 51562 Section 1 or ISO/DIS 3105 (including calibration thereof). The measurements are carried out at 25.0° C. (+−0.1° C.). The viscosity figure (specified in mm2/s) is the arithmetic mean of three independently conducted individual measurements. The measurement uncertainty in the kinematic viscosity is 1.05%. Depending on the measurement range, different viscometer tubes are used having corresponding directional constants:

| Measurement range | Capillary No. | Directional constant |
|---|---|---|
| 0.5-3 mm$^2$/s | 0c | 0.003K |
| 0.8-5 mm$^2$/s | 0a | 0.005K |
| 1.2-10 mm$^2$/s | I | 0.01K |
| 3-30 mm$^2$/s | Ic | 0.03K |
| 10-100 mm$^2$/s | II | 0.10K |
| 30-300 mm$^2$/s | IIc | 0.30K |
| 100-1000 mm$^2$/s | III | 1K |
| 300-3000 mm$^2$/s | IIIc | 3K |
| 1000-10,000 mm$^2$/s | IV | 10K |

Information on the measurement range, the appropriate capillary No. and the constant as per VWR laboratory catalogue, 2011-2013, p. 645.8.

$^1$H-NMR spectra are recorded as a solution in CDCl3 on a Bruker Avance III HD-NMR spectrometer (5 mm broadband probe with ATMA and Z-gradient) at a measuring frequency of 500.13 MHz. $^{29}$Si-NMR are recorded as a solution in $C_6D_6$-toluene on a Bruker Avance III HD-NMR spectrometer (5 mm broadband probe with ATMA and Z-gradient) at a measuring frequency of 90.34 MHz.

Spectra are evaluated in a manner known to those skilled in the art and as described in the following literature: "Über die $^1$H-, $^{13}$C- und $^{29}$Si-NMR chemischen Verschiebungen einiger linearer, verzweigter und cyclischer Methyl-Siloxan-Verbindungen", [On the $^1$H-, $^{13}$C- and $^{29}$Si-NMR chemical shifts of some linear, branched and cyclic methylsiloxane compounds] G. Engelhardt, H. Jancke; J. Organometal. Chem. 28 (1971), 293-300; "Chapter 8-NMR spectroscopy of organosilicon compounds", Elizabeth A. Williams, The Chemistry of Organic Silicon Compounds, 1989 John Wiley and Sons Ltd, 511-533.

The amine number indicates how many mmol of KOH are equivalent to a gram of the substance to be determined. The amine number is determined in accordance with DIN 16945 Version 1989-03.

EXAMPLES

In order to demonstrate the advantage of the oil-in-water emulsions having polysilicate compounds using organic solvents, this is tested in comparison with a formulation with polysilicate compounds or a formulation with MQ methyl-silicone resin using the organic solvent diethylene glycol butyl ether (as prior art).

The polydimethylsiloxane (P-1) comprising aminoalkyl groups used in the test examples is a mixed hydroxy-/methoxydimethylsilyl-terminated copolymer composed of aminoethylaminopropylmethylsiloxane and dimethylsiloxane units, having a viscosity of 982 mPas (at 25° C. and a shear rate of 10 1/s), and an amine number of 0.287 mmol/g.

The polydimethylsiloxane (P-2) comprising aminoalkyl groups used in the test examples is a mixed hydroxy-/methoxydimethylsilyl-trimethylsilyl-terminated copolymer (68 mol % SiMe$_3$ end groups, 29 mol % SiMe$_2$OH end groups, 3 mol % SiMe$_2$OMe end groups, determined by $^{29}$Si-NMR) composed of aminoethylaminopropylsiloxane and dimethylsiloxane units having a viscosity of 69 mm$^2$/s (measured at 25° C. with capillary No. II) and an amine number of 0.12 mmol/g.

The silicate compound (S-1) used in the test examples is a mixture of tetraethoxysilicate of the general formula VI and a polysilicate compound having 2 units of the general formula VII and 1 to 7 units of the general formula VIII, in which $R^{10}$ is an ethyl radical, having a SiO$_2$ content of 40% by weight.

Preparation of the Various Formulations

Formulation E-1 According to the Invention 95.0 g of the polydimethylsiloxane (P-1) comprising aminoalkyl groups and 5.0 g of the silicate compound (S-1) are mixed at room temperature to give a colourless, clear oil mixture (M-1).

7.0 g of demineralized water, 12.0 g of n-butyl glycol (obtainable under the trade name ethylene glycol butyl ether from Sigma-Aldrich) and 0.9 g acetic acid (80% aqueous solution obtainable from Brenntag) are initially charged and mixed at room temperature. 17.0 g of the oil mixture (M-1) and 63.1 g of demineralized water are stirred in successively at room temperature with the aid of a propeller stirrer. A translucent, colourless emulsion (E-1) is obtained. The emulsion is also homogeneous and stable after 6 months' storage at room temperature and at 40° C.

Comparative Example Formulation CE-2,
Non-Inventive, Analogous to DE 10 2014 216 380

7.0 g of demineralized water, 2.9 g of ethylene glycol monohexyl ether (commercially available from BASF), 6.0 g of diethylene glycol monobutyl ether (commercially available from BASF) and 0.4 g of acetic acid (80% aqueous solution obtainable from Brenntag) are initially charged and mixed at room temperature. 17.0 g of the oil mixture (M-1), 64.1 g of demineralized water, 0.5 g of acetic acid and 2.1 g of diethylene glycol monobutyl ether are stirred in successively at room temperature with the aid of a propeller stirrer. A clear colourless emulsion is obtained (VE-2).

Comparative Example Formulation CE-3,
Non-Inventive, Analogous to DE 10 2014 216 380

7.0 g of demineralized water, 9.0 g of n-butyl glycol (available under the trade name ethylene glycol butyl ether from Sigma-Aldrich), 3.0 g of diethylene glycol monobutyl ether (commercially available from BASF) and 0.3 g of acetic acid (80% aqueous solution obtainable from Brenntag) are initially charged and mixed at room temperature.

17.0 g of the oil mixture (M-1), 63.5 g of demineralized water and 0.2 g of acetic acid are stirred in successively at room temperature with the aid of a propeller stirrer. A clear, colourless emulsion (VE-3) is obtained.

Formulation E-4 According to the Invention 80.0 g of the polydimethylsiloxane (P-2) comprising aminoalkyl groups and 20.0 g of the silicate compound (S-1) are mixed at room temperature to give a colourless, clear oil mixture (M-2).

7.0 g of demineralized water, 12.0 g of n-butyl glycol (obtainable under the trade name ethylene glycol butyl ether from Sigma-Aldrich) and 0.3 g of acetic acid (80% aqueous solution obtainable from Brenntag) are initially charged and mixed at room temperature. 25.0 g of the oil mixture (M-2) and 55.7 g of demineralized water are stirred in successively at room temperature with the aid of a propeller stirrer. A translucent, whitish emulsion (E-4) is obtained. The emulsion is also homogeneous and stable after 6 months' storage at room temperature and also at 40° C.

Formulation E-5 According to the Invention 10.0 g of demineralized water, 17.0 g of n-butyl glycol (obtainable under the trade name ethylene glycol butyl ether from Sigma-Aldrich) and 0.4 g of acetic acid (80% aqueous solution obtainable from Brenntag) are initially charged and mixed at room temperature. 35.0 g of the oil mixture (M-2) and 37.6 g of demineralized water are stirred in successively at room temperature with the aid of a propeller stirrer. A slightly cloudy, whitish emulsion (E-5) is obtained. The emulsion is also homogeneous and stable after 6 months' storage at room temperature and also at 40° C.

Application Examples

Application Example 1

Water-Repellency Test (Water/Alcohol—Drop Test)

This test method serves to determine the hydrophobic finish of leather or textiles.

For the purpose of impregnating leather or textiles, the emulsions (E-1) and (VE-2) are diluted with deionized water to an active ingredient proportion of 5%.

The treated sample (leather or textile) to be tested is placed over a petri dish such that there is no contact with the bottom in the test region of the test sample.

Starting with the test liquid W (dist. water), 40 μl drops are carefully placed on each of three positions of the test sample. These positions should be at least 2 cm apart from one another. During placing of the test liquids, the test sample must not be touched by the pipette. In order to avoid excessive evaporation during the test, the test sample is covered with a petri dish. The sample is observed from an angle of ca. 45° until the drop is completely drawn in. This is the rewetting time. If the drops are still on the test sample after 5 hours, the test is terminated and stated as time >300 min (in the case of textiles). In the case that the sample to be tested is leather, the time is specified in seconds (sec). The test is then conducted with the next test liquid.

TABLE 1

Composition of the test liquid:

| Standard - Test liquids | | Percentage composition | |
|---|---|---|---|
| | | Isopropanol | dist. Water |
| Water | 0/100 | 0 | 100 |
| 1 | 10/90 | 10 | 90 |
| 2 | 20/80 | 20 | 80 |
| 3 | 30/70 | 30 | 70 |

Evaluation

The result for the hydrophobically finished leather or textiles is stated as the rewetting time. The higher the time, the more hydrophobic is the finish.

TABLE 2

Test result with respect to impregnating cotton:

| Rewetting-test: | Formulation (E-1) | Formulation CE-2* (Comparative example) | Formulation CE-3* (Comparative example) | Formulation E-4 |
|---|---|---|---|---|
| Water | >300 min | >300 min | >300 min | >300 min |
| Water/Iso = 90/10 | >300 min | 20 min | >300 min | 240 min |
| Water/Iso = 80/20 | 70 min | 4 min | 5 min | 70 min |

*non-inventive

Surprisingly, it appears that the inventive formulations (E-1) and (E-4) are distinctly superior to the non-inventive formulation (CE-2), which comprises diethylene glycol butyl ether.

Even the formulation CE-3, which comprises only 18.6 parts by weight diethylene glycol butyl ether, based on 100 parts by weight of the polydimethylsiloxane (P-1), exhibits a significantly shorter rewetting time in the rewetting test with water/isopropanol 80/20 compared to the inventive formulations (E-1) and (E-4).

TABLE 3

Test result with respect to the impregnation of light lining leather:

| Rewetting test: | Untreated* | Formulation (E-1) |
|---|---|---|
| Water | 3 sec | >15 sec |
| Water/Iso = 90/10 | 0 sec | >15 sec |
| Water/Iso = 80/20 | 0 sec | 10 sec |

*non-inventive

The formulation (E-1) according to the invention is also excellent for impregnating lining leather.

Application Example 2

Determination of the Water-Repelling Properties (Spray Method)

Cotton treated analogously to application example 1 is stretched over a petri dish.

250 ml of demineralized water are sprayed continuously onto the test fabric from a height of 150 mm with the aid of a nozzle. Immediately after completion of the spraying, the test fabric is vigorously shaken and the appearance of the surface is then evaluated according to the assessment criteria below.

Evaluation

Assessment Criteria According to the Template

100 No adhesion to or wetting of the surface
90 Slight, randomly distributed adhesion to or wetting of the surface
80 Wetting of surface at the spray points
70 Partial wetting of the entire surface
50 Complete wetting of the entire surface

TABLE 4

Test result with respect to the impregnation of cotton:

|  | Formulation (E-1) | Formulation CE-2* (Comparative example) | Formulation E-4 |
|---|---|---|---|
| Spray method: | 85 | 70 | 90 |

*non-inventive

Surprisingly, it is apparent that the inventive formulations (E-1) and (E-4) are clearly superior to the non-inventive formulation (CE-2), which comprises diethylene glycol butyl ether.

Application Example 3

Determination of the Water-Repelling Properties in a Washing Machine

For impregnation in the washing machine, the following fabrics are used:

Polyester material: wfk 30A, 100% polyester, width: 100 cm, Article No. 30000, fabric weight ca. 170 g/m² from wfk Testgewebe GmbH Polyamide material: wfk 40A, 100% polyamide 6.6, width: 80 cm, Article No. 40000, fabric weight ca. 75 g/m² from wfk Testgewebe GmbH In each case, 600 g of the fabrics to be tested are placed in the drum of a washing machine (Novotronic® W 941, Miele). 100 g of the formulation to be tested are placed in the fabric conditioner compartment. Then, a main wash cycle at 40° C. with spin (1200 rev/min) is started. After completion of the wash program, the fabrics are taken out of the washing machine, dried on the line and then air-conditioned in a climate-controlled room overnight at 23° C. and 60% relative humidity.

The impregnation efficacy is tested by determination of the penetration time of a coloured water drop into the fabric. The drop application, the test liquids used and the evaluation is carried out as described for textiles in application example 1.

TABLE 5

Test result with respect to impregnation of polyester:

| Rewetting test: | Formulation (E-1) | Formulation (E-5) |
|---|---|---|
| Water | >300 min | >300 min |
| Water/Iso = 90/10 | >300 min | >300 min |
| Water/Iso = 80/20 | >300 min | >300 min |

TABLE 6

Test result with respect to impregnation of polyamide:

| Rewetting test: | Formulation (E-1) | Formulation CE-2* (Vergleichsbeispiel) | Formulation (CE-5) |
|---|---|---|---|
| Water | >300 min | >300 min | >300 min |
| Water/Iso = 90/10 | >300 min | >300 min | >300 min |
| Water/Iso = 80/20 | >300 min | >300 min | >300 min |
| Water/Iso = 70/30 | >300 min | 250 min | >300 min |

*non-inventive

Surprisingly, it is apparent that the inventive formulations (E-1) and (E-5) have an excellent impregnation efficacy and are clearly superior to the non-inventive formulations (CE-2), which comprises diethylene glycol butyl ether.

Application Example 4

Determination of the Water-Repelling Properties in Porous Substrates

Determination of Water-Repellency on Wood by Weight Increase

Wooden cubes with an edge length of 3 cm made of beech and spruce are used as test material.

One end face of the wooden cubes is dipped into the test solution to a depth of ca. 1 cm for 5 s and then dabbed with a tissue.

After drying at room temperature (3 days), the cubes are weighed (g1) on an analytical balance (type AE 200, Mettler-Toledo GmbH, Germany). Subsequently, the cubes are placed on the treated side for one hour in water to a depth of ca. 0.5 cm, taken out, dabbed with a tissue and the weight determined (g2).

Weight increase in [%]: $\Delta g = (g2-g1)/g1 \times 100$

The lower the weight increase, the better the impregnation efficacy.

For the purpose of impregnating the wooden cubes, the emulsion (E-1) is diluted with deionized water to an active ingredient fraction of 5%.

TABLE 7

Test result with respect to the impregnation of beech and spruce:

|  | untreated Weight increase Δg | Formulation (E-1) |
|---|---|---|
| Beech | 55% | 5% |
| Spruce | 8% | 2% |

The formulation (E-1) according to the invention shows an excellent impregnation efficacy in the case of wood as porous substrate.

Properties of Marble

Treatment of marble (Jura limestone yellow, polished on one side, 5×5×1 cm, Herbst Burghausen):

For the purpose of impregnating marble, the emulsion (E-1) is diluted with deionized water to an active ingredient fraction of 2% or 5%.

The 2% or 5% test solutions are filled in a bowl to a depth of ca. 0.2-0.5 cm. The marble slabs are placed in the solution on the polished side for ca. 1-5 s, then taken out and the polished side is wiped gently with a cosmetic tissue such that droplets are no longer visible on the surface. The marble slabs are left to dry at RT (20° C.). After three days, the hydrophobicity of the marble is determined by means of a contact angle measurement of a water drop, the soil-repellence by means of soybean oil and ink and the change in gloss by means of a gloss measuring device.

Determination of the Water-Repellence

The water resistance of the treated marble is determined by measuring the contact angle of a water drop on the surface of the untreated and treated marble by means of a contact angle measuring device (Ramé-hart Inc., USA). The drop size of the demineralized water used is 0.01 ml.

TABLE 8

| Test result with respect to the water-repellence on marble slabs: | |
|---|---|
| | Contact angle |
| Untreated | 36° |
| 2% solution formulation (E-1) | 92° |
| 5% solution formulation (E-1) | 95° |

The formulation (E-1) according to the invention exhibits an excellent water-repelling effect on marble as porous substrate, which is expressed by the distinctly increased contact angle compared to the untreated marble slab.

Determination of the Soil-Repellence 0.4 ml drops of soybean oil (Rapunzel Organic Soybean Oil, commercially available from Amazon) and a blue ink (Pelikan 4001 ink cartridges for pens, commercially available from Amazon) are placed on the surface of the untreated and treated marble. After 5 min, the marble is wiped with a tissue and the appearance of the remaining stains are visually assessed.

TABLE 9

| visual assessment of the soil-repelling effect on marble slabs: | | |
|---|---|---|
| Visibility of the stain | | |
| Highly visible | --- | |
| Moderately visible | -- | |
| Faintly visible | - | |
| Not visible | o | |
| | Soybean oil | Blue ink |
| Untreated | --- | --- |
| 2% solution of formulation (E-1) (52W18 B; HC 621) | o | - |

TABLE 9-continued

| visual assessment of the soil-repelling effect on marble slabs: | | |
|---|---|---|
| 5% solution of formulation (E-1) (52W18 B; HC 621) | o | - |

The formulation (E-1) according to the invention exhibits an excellent soil-repelling effect on marble as porous substrate, particularly compared to the untreated marble slab.

Determination of the Gloss Change

The gloss is determined on the untreated and treated surface of the marble by means of a gloss measuring device (micro-tri -gloss, Byk Gardner) at a beam angle of 20°. The difference in gloss value between untreated and treated marble is the gloss change specified in the Table.

TABLE 10

| Gloss change of marble slabs: Change in gloss value compared to an untreated marble slab | |
|---|---|
| 2% solution of formulation (E-1) | 8 GU |
| 5% solution of formulation (E-1) | 16 GU |

The marble porous substrate undergoes a surprisingly distinct gloss increase by treatment with the formulation (E-1) according to the invention.

Application Example 5

Determination of the Properties on Smooth Substrates

For the purpose of impregnating smooth substrates, a black, matt plastic sheet (material: ABS, Narbung 3, 150× 100×3 mm, commercially available from Merck & Partner GmbH, Ulm) is used.

0.5 ml of the emulsion (E-4) is placed on the plastic sheet and polished in with a cosmetic tissue. The sheet is left at RT (20° C.) for 24 h. The gloss change is determined using a gloss measuring device and the water proofing tested by brief rinsing with drinking water (ca. 10 sec.).

Determination of the Gloss Change

The gloss is determined by means of a gloss measuring device (micro-tri-gloss, Byk Gardner) at a beam angle of 85° on the untreated and treated surface of the plastic sheet. The difference in the gloss value between untreated and treated plastic sheet is the gloss change specified in the Table.

TABLE 11

| Gloss change of the plastic sheet: Change in the gloss value compared to an untreated plastic sheet | |
|---|---|
| Emulsion (E-4) before rinsing | 0.9 GU |
| Emulsion (E-4) after rinsing | 0.9 GU |

The plastic smooth substrate undergoes a surprisingly distinct gloss increase by treatment with the formulation (E-4) according to the invention which is also permanent after treatment with water.

The invention claimed is:

1. Oil-in-water emulsions comprising:

(i) 100 parts by weight of at least one polyorganosiloxane (P) bearing aminoalkyl groups, liquid at 20° C., and comprising at least 80 mol % of units selected from units consisting of the formulae Ia, Ib, IIa and IIb $$R^1{}_2SiO_{(2/2)} \qquad (Ia),$$

$$R^1{}_aR^2SiO_{(3-a)/2} \qquad (Ib),$$

$$R^3{}_3SiO_{(1/2)} \qquad (IIa),$$

$$R^3{}_2R^4SiO_{(1/2)} \qquad (IIb),$$

in which a is 0 or 1, $R^1$ each individually is an alkyl radical having 1-40 carbon atoms unsubstituted or substituted by halogens, $R^2$ each individually is an aminoalkyl radical of the formula III $$-R^5-NR^6R^7 \qquad (III),$$

where $R^5$ each is individually is a divalent hydrocarbon radical having 1-40 carbon atoms, $R^6$ each individually is a monovalent hydrocarbon radical having 1-40 carbon atoms, hydrogen or alkanoyl radical and $R^7$ each individual is a radical of the formula IV $$-(R^8-NR^6)_xR^6 \qquad (IV),$$

where x is 0 or an integer of 1 to 40 and $R^8$ each individually is a divalent radical of the formula V $$-(CR^9R^9-)_y \qquad (V),$$

where y is an integer of 1 to 6, $R^9$ each individually is hydrogen or a hydrocarbon radical having 1-40 carbon atoms, $R^3$ each individually is an alkyl radicals having 1-40 carbon atoms which is unsubstituted or substituted by halogens, $R^4$ each individually is an —OR or —OH radicals and, R each individually is an alkyl radical having 1-40 carbon atoms which is unsubstituted or substituted by halogens, wherein the average ratio of units of the formulae Ia and Ib to the sum total of units of the formulae IIa and IIb in the polyorganosiloxane (P) is 0.5 to 500 and polyorganosiloxane (P) has an average amine number of at least 0.1 mequiv/g, (ii) at least one protonating agent, (iii) 1 to 80 parts by weight of silicate compound selected from tetraalkoxysilicate(s) of the formula VI $$R^{10}{}_4Si \qquad (VI),$$

and polysilicate compound(s) comprising at least 80 mol % units of the formulae VII and VIII and at least 2 units of the formula VII $$R^{10}O_3SiO_{1/2} \qquad (VII),$$

$$R^{10}O_2SiO_{2/2} \qquad (VIII),$$

and mixtures thereof, where $R^{10}$ each individually is a hydrocarbon radical having 1-18 carbon atoms which is unsubstituted or substituted by halogens, (iv) water, (v) at most 5 parts by weight of emulsifier(s) and (vi) at least 5 parts by weight of at least one organic solvent selected from monoalcohols of the formula IX $$R^{11}-OH \qquad (IX),$$

and dialcohol monoethers of the formula X $$R^{12}O-R^{13}-OR^{14} \qquad (X),$$

and mixtures thereof, where $R^{11}$ each individually is a monovalent hydrocarbon radical having 2-18 carbon atoms, $R^{12}$ each individually is a monovalent hydrocarbon radical having 1-18 carbon atoms, $R^{13}$ each individually is a divalent hydrocarbon radical having 2-12 carbon atoms, $R^{14}$ each individually is hydrogen, a monovalent hydrocarbon radical having 1-6 carbon atoms or an acetyl group, with the proviso that the emulsion contains no di-, tri- or oligoglycol ether of the formula XI $$R^{12}-(O-CH_2CH_2)_m-OH \qquad (XI),$$

where $R^{15}$ has the definition of $R^{12}$ and m is an integer and is 2 or greater than 2.

2. An emulsion of claim 1, wherein the radicals $R^1$ and $R^3$ are alkyl radicals having 1 to 6 carbon atoms.

3. An emulsion of claim 1, wherein the radicals $R^6$ are alkyl radicals having 1 to 6 carbon atoms, hydrogen or acetyl.

4. An emulsion of claim 2, wherein the radicals $R^6$ are alkyl radicals having 1 to 6 carbon atoms, hydrogen or acetyl.

5. An emulsion of claim 1, wherein the radicals $R^2$ are selected from the group consisting of $-CH_2N(R^6)_2$, $-(CH_2)_3N(R^6)_2$, and $-(CH_2)_3N(R^6)(CH_2)_2N(R^6)_2$, and mixtures thereof.

6. An emulsion of claim 1, wherein the protonating agent is selected from the group consisting of formic acid, acetic acid, sulfuric acid, hydrochloric acid, and mixtures thereof.

7. An emulsion of claim 1, wherein the radicals $R^{10}$ are methyl, ethyl, and/or propyl.

8. An emulsion of claim 1, wherein the radicals $R^{11}$ are alkyl radicals having 2 to 12 carbon atoms.

9. An emulsion of claim 1, wherein the radicals $R^{12}$ are alkyl radicals having 1 to 12 carbon atoms, the radicals $R^{13}$ are alkylene radicals having 2 to 6 carbon atoms, and the radicals $R^{14}$ are a hydrogen atom.

10. A process for treating substrate(s), comprising contacting the substrate(s) with an oil-in-water emulsion of claim 1.

11. The emulsion of claim 1, wherein the solvent comprises ethylene glycol monobutyl ether.

12. The emulsion of claim 1, wherein the solvent consists of ethylene glycol monobutyl ether.

13. The emulsion of claim 1, wherein terminal groups of the at least one polyorganosiloxane (P) bearing aminoalkyl groups consist of dimethylmethoxysilyl and hydroxydimethylsilyl groups.

14. The emulsion of claim 1, wherein terminal groups of the at least one polyorganosiloxane (P) bearing aminoalkyl groups contain about 29 mol percent hydroxydimethylsilyl groups and about three mol percent dimethylmethoxysilyl groups.

* * * * *